United States Patent
Hayward

(10) Patent No.: US 6,822,203 B2
(45) Date of Patent: Nov. 23, 2004

(54) REACTIVE HOT WIRE CONTROL APPARATUS AND METHOD RESPONSIVE TO WIRE THERMAL EXPANSION AND CONTRACTION

(75) Inventor: Kevin M. Hayward, Medford, MA (US)

(73) Assignee: Shanklin Corporation, Ayer, MA (US)

( * ) Notice: Subject to any disclaimer, the term of this patent is extended or adjusted under 35 U.S.C. 154(b) by 0 days.

(21) Appl. No.: 10/251,415

(22) Filed: Sep. 20, 2002

(65) Prior Publication Data

US 2004/0056019 A1 Mar. 25, 2004

(51) Int. Cl.$^7$ ................................. H05B 1/02
(52) U.S. Cl. .................. 219/512; 219/494; 219/243; 156/583.2
(58) Field of Search .................... 219/512, 509, 219/494, 243; 338/316; 156/583.1, 583.2, 583.7, 583.9

(56) References Cited

U.S. PATENT DOCUMENTS

| | | | | |
|---|---|---|---|---|
| 1,671,300 A | * | 5/1928 | MacDonald et al. | 219/388 |
| 3,283,126 A | * | 11/1966 | Velyel | 219/243 |
| 3,569,667 A | * | 3/1971 | Ryswick | 219/243 |
| 3,721,801 A | * | 3/1973 | Bate | 219/243 |
| 3,746,838 A | * | 7/1973 | Drugmand | 219/512 |
| 3,840,722 A | * | 10/1974 | Mayer et al. | 219/243 |
| 3,883,720 A | * | 5/1975 | Snider | 219/535 |
| 3,965,333 A | * | 6/1976 | Elsner et al. | 219/243 |
| 3,976,196 A | | 8/1976 | Mueller | 206/526 |
| 3,989,926 A | * | 11/1976 | Yoshizawa et al. | 219/216 |
| 4,288,271 A | * | 9/1981 | Campbell, Jr. et al. | 156/359 |
| 4,377,738 A | | 3/1983 | Berg | 219/490 |
| 4,856,260 A | | 8/1989 | Woo et al. | 53/373 |
| 4,964,944 A | | 10/1990 | Christine et al. | 156/515 |
| 5,321,230 A | * | 6/1994 | Shanklin et al. | 219/492 |
| 5,597,499 A | | 1/1997 | Dunn | 219/243 |
| 5,603,801 A | | 2/1997 | DeFriese et al. | 156/515 |
| 5,791,125 A | | 8/1998 | Kallner | 53/477 |

FOREIGN PATENT DOCUMENTS

FR   1.136.990   5/1957
GB   901574   7/1962

* cited by examiner

Primary Examiner—John A. Jeffery
(74) Attorney, Agent, or Firm—Nields & Lemack

(57) ABSTRACT

Control system and apparatus for controlling current input to an electrical resistance element such as a seal wire. The system and apparatus of the present invention is a closed loop feedback modification to conventional systems, and takes advantage of the inherent expansion of the seal wire as it is heated. When the seal wire expands to a predetermined length, a switch is triggered which interrupts at least a portion of the power supplied to the wire for heating. The interruption continues until the wire contracts to a length less than the predetermined length, whereupon the interruption ceases and heating of the wire resumes normal operation.

11 Claims, 9 Drawing Sheets

WIRE AT LOW TEMP

REACTIVE HOT WIRE CONTROL APPARATUS AND METHOD RESPONSIVE TO WIRE THERMAL EXPANSION AND CONTRACTION

BACKGROUND OF THE INVENTION

Packaging machines for wrapping and sealing plastic film about an article conventionally utilize a heated wire to seal film layers to one another and to melt through the layers in order to separate one article from another as the articles pass through the machine. Current is supplied to the wire to heat the wire to a high temperature in order to effect the seal and cutting operation. The appearance of the resulting seal is fine and neat as the film shrinks tightly around the package, especially where polypropylene films are involved. Such hot wires are typically used to form both end seals and side seals.

As the wire contacts the film and performs its intended function, it loses heat to the film as well as to the surrounding environment. Accordingly, current must be continually or continuously supplied to the wire in order to maintain the appropriate wire temperature.

Typically the wire is a resistive element approximately 45–50 thousandths of an inch in diameter, therefore making it susceptible to temperature build-up, fatigue and failure. Thus, if the current to the wire is not properly controlled and the wire temperature becomes too high, the wire tends to break. For example, as machine speed increases, the current impulse sent to the seal wire to heat the wire to the appropriate temperature becomes more and more frequent, until such point that the seal system is, in effect, on at all times. The wire becomes more susceptible to failure as the film being sealed is not drawing away the excess heat (acting as a heat sink) as fast as the heat is being applied to the wire. The wire eventually softens, stretches, and breaks. This is a common occurrence particularly when proper operator attention is absent. Changing the wire requires that the machine be shut down, resulting in considerable loss of productivity.

U.S. Pat. No. 5,597,499 addresses this problem by providing a seal wire control system that controls the duration of heat impulses applied to the sealing wire. It utilizes an open loop configuration that regulates the heat applied to the seal wire based on the number of articles and the frequency that the articles are run through the wrapper. However, the versatility of this solution is limited.

It would be desirable to provide a seal system that is a closed loop feedback configuration that detects when the wire is too hot, and responds by intercepting the input of the heat in order to protect the wire from fatigue and failure.

These and other objects will be made apparent by reference to the following description and drawings.

SUMMARY OF THE INVENTION

The problems of the prior art have been overcome by the present invention, which provides a control system and apparatus for controlling current input to an electrical resistance element such as a seal wire. The system and apparatus of the present invention is a closed loop feedback modification to conventional systems, and takes advantage of the inherent expansion of the seal wire as it is heated. When the seal wire expands to a predetermined length, a at least a portion of the power supplied to the wire for heating is interrupted. The interruption will continue until the wire contracts to a length less than the predetermined length, whereupon the interruption will cease and normal operation is resumed for heating of the wire.

The device of the present invention thus directly monitors the expansion of the seal wire, and reduces or eliminates current applied to the seal wire when the expansion reaches a predetermined length. Current can then be increased, and preferably restored to its original level, when the seal wire contracts sufficiently to minimize the danger of breakage.

In a preferred embodiment, heat input to the seal wire is in two modes. The first mode is a constant heat mode, whereby a constant amount of current is passed through the wire at rest or in idle mode to keep the wire warm and ready for service in short notice. The second mode is an impulse heat mode, in which a specific duration pulse of current through the seal wire is applied as the seal wire is about to engage the film. The duration of the impulse mode is generally responsive to the rapidity of the sealing cycle (e.g., the sealing jaw operation). The second or impulse mode is the mode interrupted when the wire expands to a predetermined length in the preferred embodiment of the present invention.

DETAILED DESCRIPTION OF THE INVENTION

Figure 1:
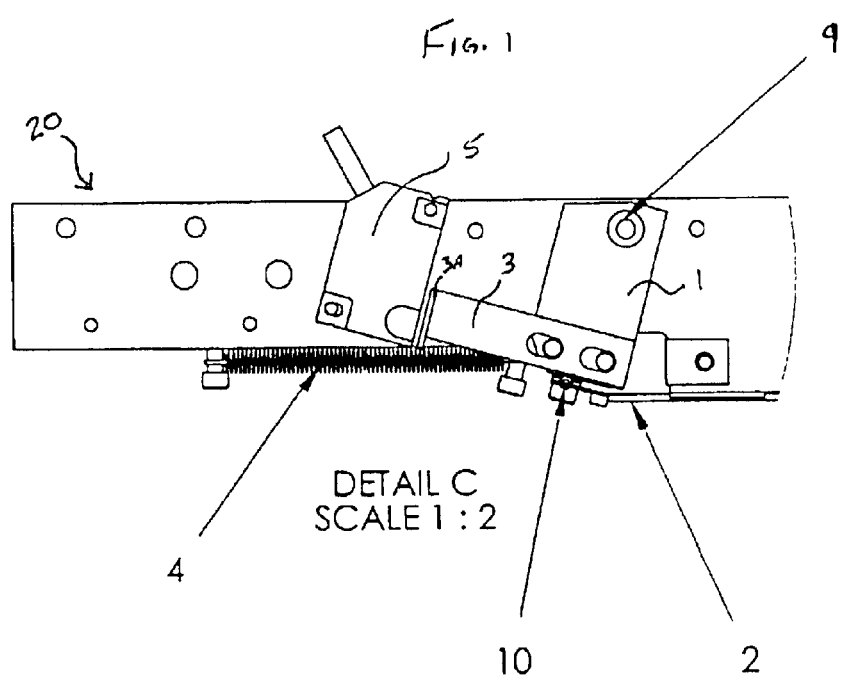
FIG. 1 is a partial front view of an end seal assembly in accordance with the present invention.
Figure 2:
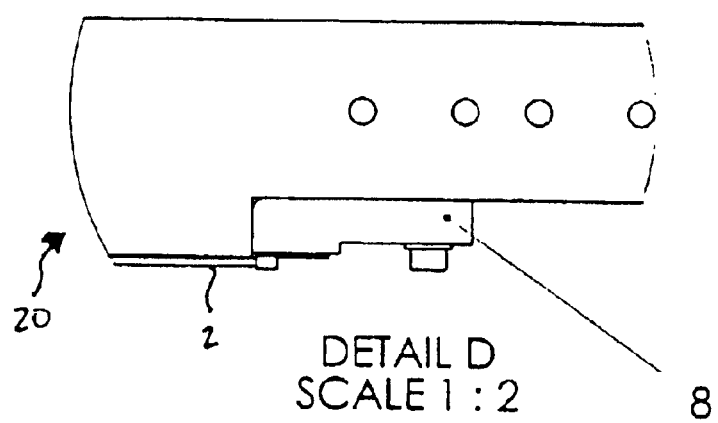
FIG. 2 is a partial front view of an end seal assembly in accordance with the present invention.
Figure 3:
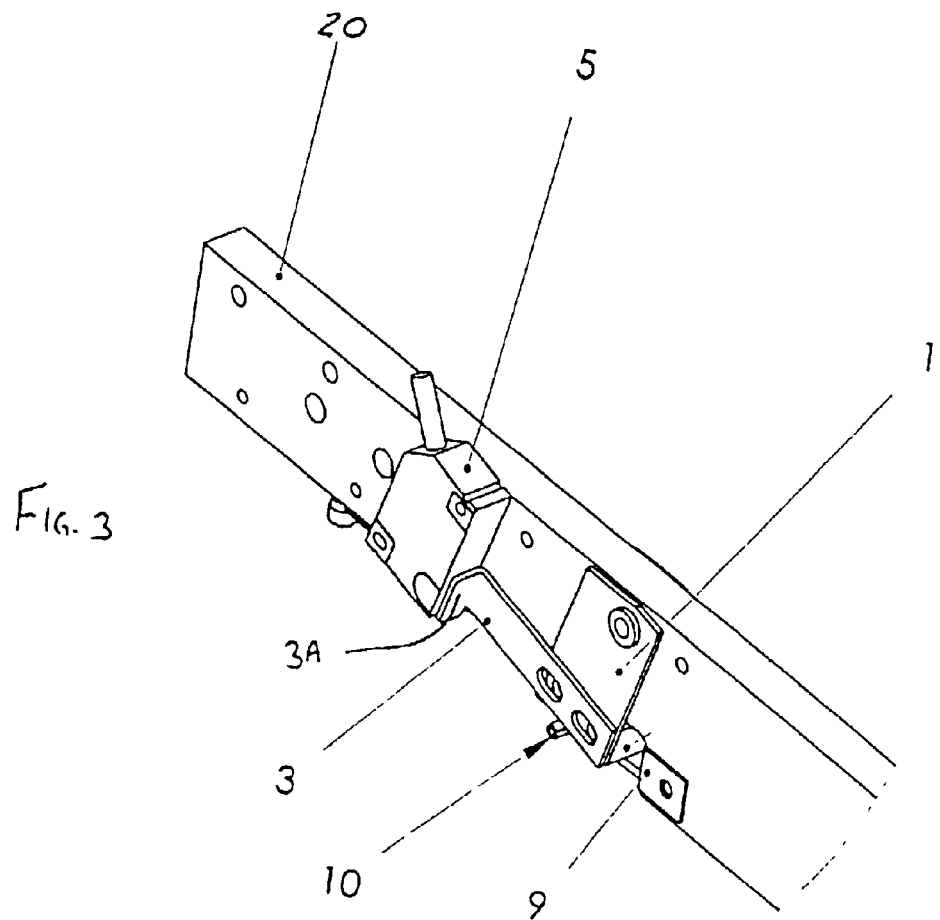
FIG. 3 is a perspective view of an end seal assembly in accordance with the present invention.

Turning now to the figures, there is a shown a portion of an end seal assembly for a packaging machine in accordance with one embodiment of the present invention. It should be understood that the end seal assembly is shown by way of illustration, as the present invention is not limited to any particular location of the sealing mechanism. Top jaw 20 is shown (FIG. 1), which is conventionally sandwiched by a pair of opposite film clamps coupled via a film guard mount (not shown), the mount being coupled, in turn, to the top jaw 20. One end of an electrical impulse element such as a seal wire 2 is fixed to the underside of the top jaw 20 with wire tension block 8 (FIG. 2). The opposite moving or floating end of seal wire 2 is coupled to a seal wire pivot member 1 at wire terminal 10. A pivot member 1 is pivotally mounted on the top jaw 20 at pivot point 9 so that it moves in response to elongation and shrinking of the seal wire 2, depending upon the seal wire temperature. An adjustable switch actuator 3 is mounted to the seal wire pivot plate or block 1, and extends beyond the pivot member 1 towards detector 5 as shown. Preferably the actuator 3 terminates in a flange portion 3A to provide sufficient surface area to actuate proximity switch 3 as discussed in greater detail below. One end of spring 4, such as a coil spring, is fixed to the actuator 3 and the opposite end of the spring 4 is fixed to the top jaw 20 so as to maintain the actuator 3 (and pivot member 1) under tension, and bias the actuator and thus the seal wire 2 in a direction away from wire tension block 8.

Figure 4:
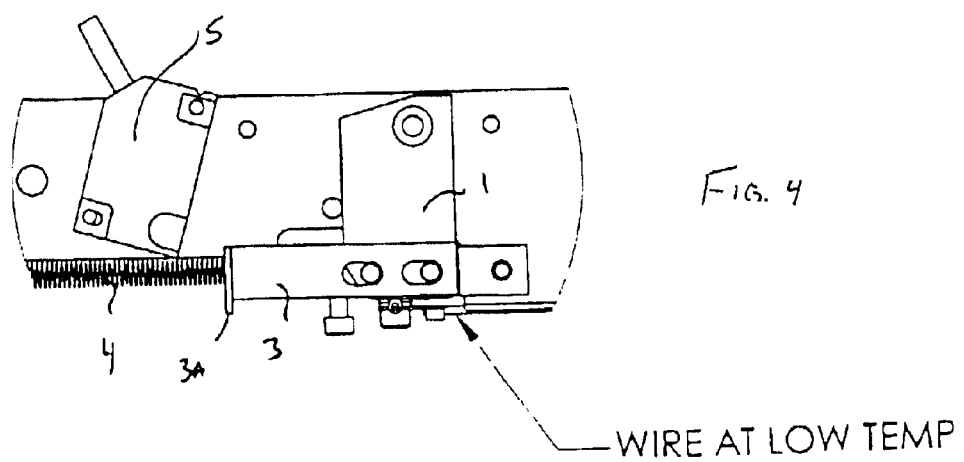
FIG. 4 is a partial front view of an end seal assembly with the seal wire at low temperature in accordance with the present invention.

Spaced a set distance from the actuator 3 is a detector 5, such as a microswitch or preferably a proximity switch. Other detectors, such as optical detectors, capable of determining when the seal wire 2 has expanded to a predetermined length are suitable and within the scope of the present invention. As current is applied to the seal wire 2 and the seal wire 2 heats up and expands, the expansion is accommodated by the pull force of the spring 4 and the pivoting action of the pivot member 1. As a result, the pivot member 1 pivots in a clockwise direction from the position shown in FIG. 4 to the position as viewed in FIG. 1, driving actuator 3 towards the sensor of the detector 5. Once the expansion of the seal wire 2 reaches a predetermined length, the detector senses the presence of the actuator 3 (actual contact between the actuator 3 and the detector 5 may not be necessary, depending upon the nature of the detector used) which then signals a device, such as a relay, that interrupts or intercepts current being supplied to the seal wire 2. Now absent the application of current, the seal wire 2 cools and contracts, and the pivot member 1 and actuator 3 are pulled in a counter-clockwise direction as viewed in FIG. 1. Once the actuator 3 is no longer in a position where it can be sensed by the detector 5, the system is returned to its normal operating mode where current (e.g., impulse power) to the seal wire 2 can be resumed. Those skilled in the art will appreciate that it is not necessary that the seal wire contract to its original length before additional current is applied. It need only contract a fraction of the amount it has expanded, resulting in the ability to rapidly cycle the current while extending significantly the life of the wire. Those skilled in the art will also appreciate that the detector can be used in a normally open mode, whereby it signals for power interruption only when the presence actuator is not sensed, as described in alternative embodiments below.

Other means of interrupting or intercepting the current being supplied to the seal wire 2 can be used and are within the scope of the present invention. For example, instead of a relay, data as to the position of the actuator could be detected and inputted to a PLC, which in turn interrupts the current being supplied to the seal wire 2.

The predetermined length to which the seal wire 2 is allowed to expand can be determined by trial and error. Preferably it is the determined maximum length the wire can withstand just prior to failure, typically manifested in the wire "drooping" and/or turning red. For example, a suitable seal wire 2 may be able to withstand a ½ inch path of travel prior to failure, in which case the apparatus of the present invention may be configured to allow a ¼ inch path of travel before the predetermined length is reached.

Those skilled in the art will appreciate that where an optical detector is used, for example, light from the detector can be directed in the path of travel of the actuator 3, and when the light is interrupted by the actuator 3 when the actuator enters the light path due to the expansion of the seal wire 2, a signal from the detector is generated to interrupt current supplied to the seal wire 2.

In an other embodiment of the present invention, the apparatus can utilize linear expansion rather than being pivotable as in the embodiment of FIGS. 1–4. For example, a position feedback device such as a linear transducer or potentiometer that correlates temperature to length can be used, and the current supplied to the seal wire can be based upon the length of the seal wire as detected or sensed by the transducer.

Figure 5:
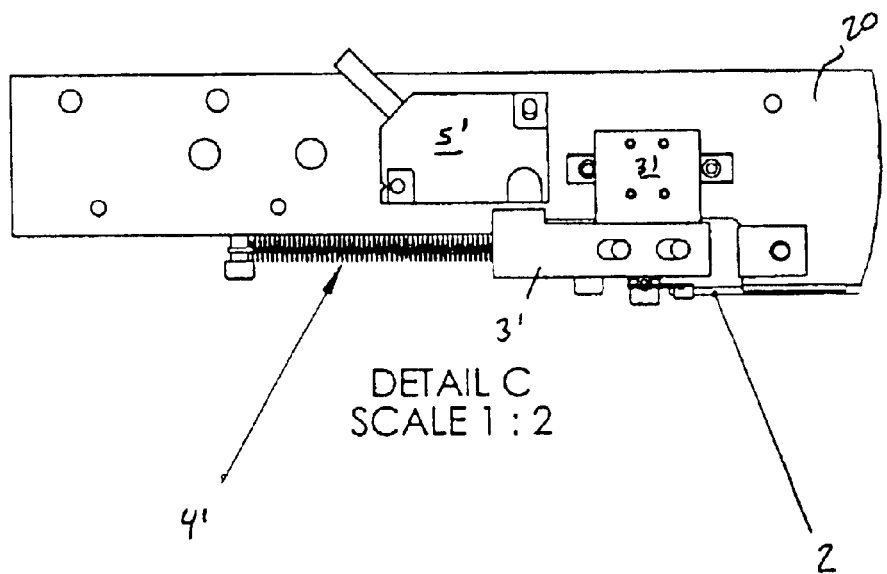
FIG. 5 is a partial front view of an end seal assembly in accordance with another embodiment of the present invention.
Figure 6:
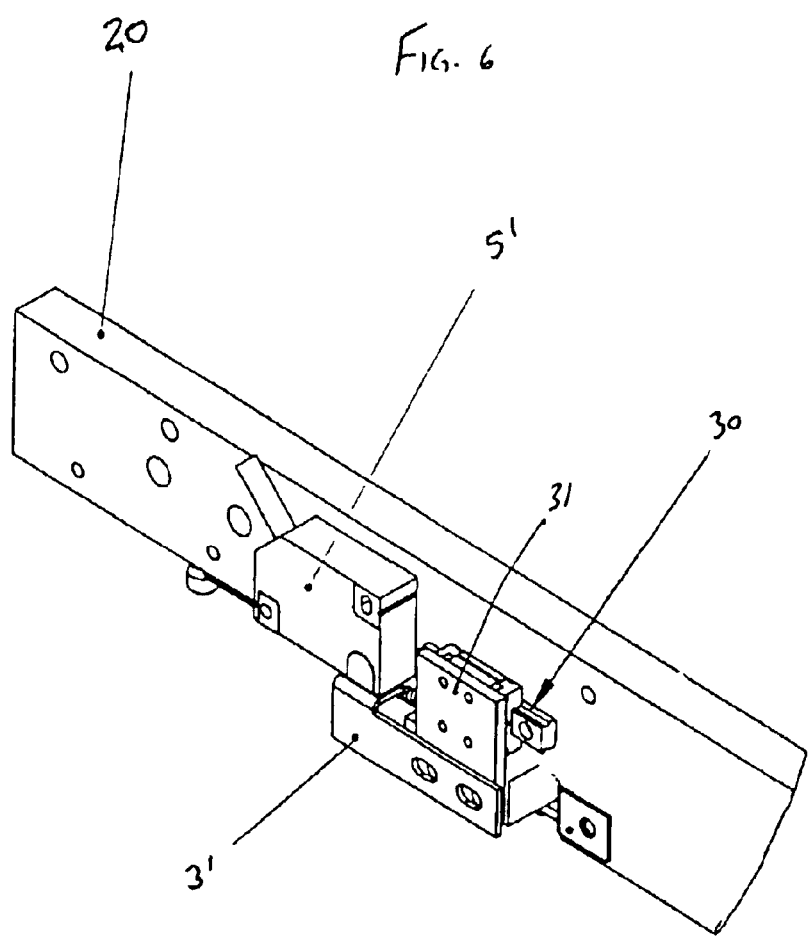
FIG. 6 is a partial perspective view of the end seal assembly of FIG. 5.

FIGS. 5 and 6 show another embodiment where the actuator moves linearly rather than pivoting. Linear guiderail 30 supporting block 31 is coupled to top jaw 20. Block 31 includes projections 32 that fit into slots on the actuator 3' so that the position of the actuator 3' can be fine tuned. In this embodiment, proximity switch 5' is in a normally open position. Thus, when actuator 3' is in the position shown in FIG. 5, the seal wire 2 has not yet expanded. Compression spring 4' is attached to a wire tension block (to which the actuator 31 is also connected) and holds the seal wire 2 in tension as before. As the wire 2 heats up and expands, the actuator 3' travels linearly (to the left in FIG. 5) a predetermined distance (as in the previous embodiment), and thus out of range of the sensing portion of the proximity switch 5'. Once the proximity switch no longer senses that the actuator 3' is positioned just below it, power supplied to the wire 2 for heating is interrupted. The interruption will continue until the wire contracts to a length less than the predetermined length, whereupon the interruption will cease and normal operation is resumed for heating of the wire.

In a preferred embodiment of the present invention, heat is input to the seal wire in two modes. The first mode is a constant heat mode, where a constant amount of current is applied to the wire at rest or in idle mode to keep the wire warm and ready for operation. Typically the constant heat is the nominal temperature necessary to perform a single seal. This is particularly advantageous when the wire may be called on to seal in short notice. It also maintains the wire warm to help prevent thermal shock to the wire. A suitable amount of current for this mode is from about 5 to about 10 amps. The second mode is an impulse heat mode. In an end seal, for example, at the point of jaw closure where the hot seal wire is pressing the film layers against a sealing pad surface, the closure of the top and bottom jaws activate a detection circuit that then triggers a specific duration of pulse of current through the seal wire to increase the temperature to physically produce a seal and cut. The impulse replaces the heat that the seal wire loses during the sealing process, such as to the two webs of film and to the opposite seal surface. A suitable amount of current for the impulse mode depends in part on the gauge and type of film to be sealed and the desired quality of the seal. For example, suitable current for sealing 60 gauge polyolefin film is from about 28 amps to about 32 amps. Both the constant and impulse modes are adjustable and either could be zero to thereby replicate a single heat configuration system.

Figure 7:
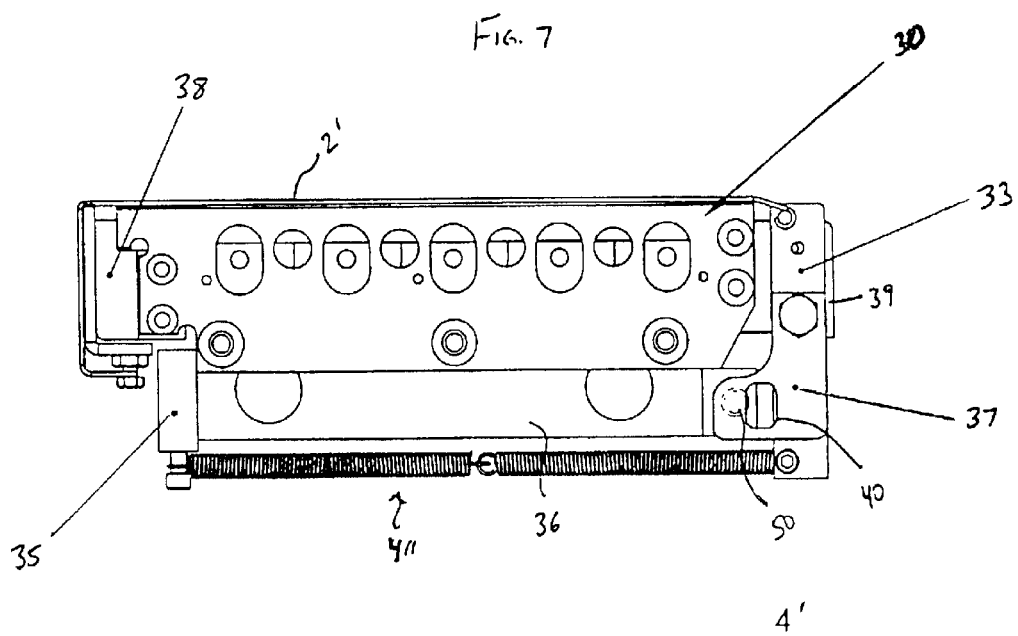
FIG. 7 is a front view of a side seal assembly in accordance with the present invention.
Figure 8:
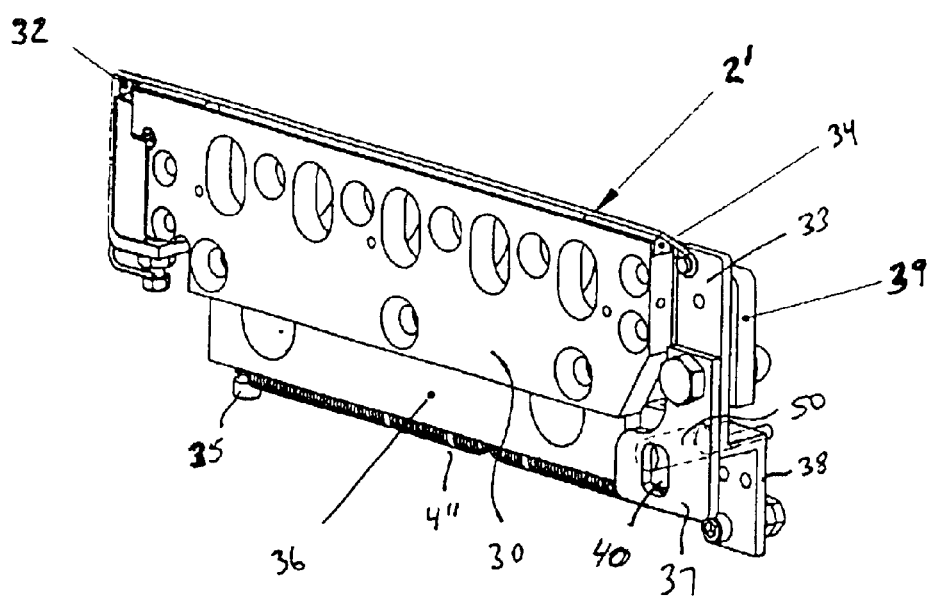
FIG. 8 is a perspective view of the side seal assembly of FIG. 7.
Figure 9:
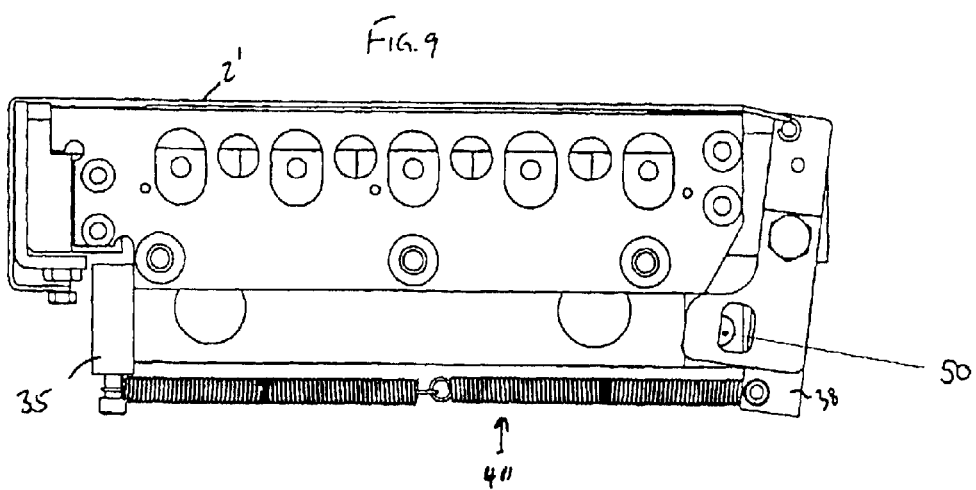
FIG. 9 is a front view of the side seal assembly of FIG. 7 when the seal wire has expanded.

In side seal applications, typically two seal wires (a top wire and a bottom wire) are used. It is generally not necessary to provide the device of the present invention on the bottom seal wire, since breakage of the bottom wire is rare. However, it is within the scope of the present invention to provide the device of the present invention on the bottom wire, either alone or in combination with protecting the top wire with the inventive device. FIGS. 7, 8 and 9 illustrate a side seal wire application on side seal bottom jaw 30. Seal wire 2' mounts at one end to a stationary wire mount 32 on wire mounting block 38 (FIG. 8) and at its opposite end to a pivot wire mount 33 that is supported by pivot mounting bracket 39. A ceramic jaw bead 34 can be positioned to accommodate the turn of the seal wire as shown in FIG. 8.

Spring mount 35 extends from bottom jaw support 36, and one end of extension spring 4" is fixed to the spring mount 35. The opposite end of spring 4" (which in the embodiment shown, is two springs coupled together) is mounted on block 38 to which actuator 37 is coupled, best seen in FIG. 8. Proximity switch 50 is shown in phantom in the figures. When the seal wire 2' is in its normal operating condition and has not expanded, the actuator 37 is positioned as shown in FIG. 7, and the proximity switch 50 senses that it is so located. Upon seal wire 2' expansion as shown in FIG. 9, the actuator 37 pivots in a clockwise direction as viewed in FIG. 7, and aperture 40 of the actuator 37 moves in front of the proximity switch sensor, causing it to interrupt power to the seal wire 2' until the seal wire 2' cools sufficiently to cause the actuator 37 to return to a position in front of the proximity switch sensor.

The present invention can be readily retrofitted on existing equipment simply by adding the actuator, detector, relay and appropriate circuitry.

What is claimed is:

1. A method for controlling the temperature of an electrical resistance heating element, comprising:

applying current to said element to heat said element in a first constant current mode in which a first amount of current is constantly supplied to said element, and in a second impulse mode in which a second amount of current is intermittently applied to said element;

allowing said element to expand a predetermined length as said element rises in temperature;

reducing the application of the impulse current applied to said element when said expansion reaches said predetermined length while maintaining the application of the constant current, thereby causing said element to contract; and increasing the impulse current to said element when said element contracts to a length less than said predetermined length.

2. The method of claim 1, further comprising detecting that said predetermined length is reached, and wherein said impulse current is reduced in response to said detection.

3. The method of claim 1, wherein said first amount of constant current is an amount of current sufficient to heat said element to a temperature sufficient to seal layers of thermoplastic film.

4. The method of claim 1, wherein said reduction of the impulse current applied to said element reduces said current to zero.

5. Apparatus for controlling the temperature of an electrical resistance heating element, comprising:

an electrical resistance heating element having a fixed portion and a movable portion mounted to a movable member, said movable member adapted to move in response to the expansion and contraction of said element;

a power supply comprising a constant current supply to constantly supply a first amount of current to said element, and an impulse current supply to intermittently supply a second amount of current to said element while maintaining the supply of said constant current;

a detector for detecting when said element expands to a predetermined length; and a device responsive to said detector for interrupting said impulse current supplied to said element when said element expands to said predetermined length.

6. The apparatus of claim 5, wherein said device responsive to said detector interrupts said impulse current supply when said element expands to said predetermined length.

7. The apparatus of claim 5, wherein said first amount of current is about 5 to 10 amps.

8. The apparatus of claim 5, wherein said device comprises a relay.

9. The apparatus of claim 5, wherein said movable member pivots towards said detector upon expansion of said element.

10. The apparatus of claim 5, further comprising an actuator connected to said movable member, and wherein said detector detects the position of said actuator.

11. Apparatus for sealing thermoplastic film having at least one sealing jaw including a seal wire, comprising:

means for supplying power to said seal wire comprising a first constant current mode in which a first amount of current is constantly supplied to said seal wire, and a second impulse mode in which a second amount of current is intermittently applied to said seal wire;

detecting means for monitoring the expansion of said seal wire;

means responsive to said detecting means for reducing the application of said impulse current while the application of said constant current is maintained the supply of said power when said detecting means senses that said seal wire has expanded beyond a predetermined limit.

* * * * *